United States Patent
Kadu (10) Patent No.: US 12,542,590 B2
(45) Date of Patent: Feb. 3, 2026

(54) SYSTEM AND METHOD FOR GROUP PROBABILITY-BASED PREFIX MODIFICATION OF UNKNOWN SYMBOL PROBABILITY DISTRIBUTIONS

(71) Applicant: Samsung Display Co., Ltd., Yongin-si (KR)

(72) Inventor: Harshad Kadu, San Jose, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 160 days.

(21) Appl. No.: 18/489,698

(22) Filed: Oct. 18, 2023

(65) Prior Publication Data

US 2025/0047352 A1 Feb. 6, 2025

Related U.S. Application Data (60) Provisional application No. 63/530,657, filed on Aug. 3, 2023.

(51) Int. Cl.
  *H04B 7/06* (2006.01)
  *H04B 7/0456* (2017.01)

(52) U.S. Cl.
  CPC ........... *H04B 7/063* (2013.01); *H04B 7/0478* (2013.01)

(58) Field of Classification Search
  CPC .............................. H04B 7/063; H04B 7/0478
  See application file for complete search history.

(56) References Cited

U.S. PATENT DOCUMENTS

| | | | |
|---|---|---|---|
| 6,252,992 B1* | 6/2001 | Ishikawa | H03M 7/42 358/1.9 |
| 6,636,167 B1* | 10/2003 | Acharya | H03M 7/40 341/65 |
| 10,057,580 B2 | 8/2018 | Hsiang | |
| 10,735,025 B2 | 8/2020 | Bennett et al. | |
| 10,763,926 B2* | 9/2020 | Tan | H04B 7/0404 |
| 10,855,989 B2 | 12/2020 | Thirumalai et al. | |
| 10,862,509 B1 | 12/2020 | Heil et al. | |
| 10,892,807 B2* | 1/2021 | Zhou | H04B 7/0478 |
| 10,904,532 B2 | 1/2021 | Thirumalai | |
| 11,108,514 B2* | 8/2021 | Lim | H04L 27/2604 |
| 2009/0028264 A1* | 1/2009 | Zhang | H04L 1/1819 375/267 |
| 2016/0044339 A1 | 2/2016 | Sung | |
| 2016/0119646 A1* | 4/2016 | Eslami | H04N 19/93 382/248 |
| 2016/0336958 A1* | 11/2016 | Henry | G06F 16/2365 |

(Continued)

*Primary Examiner* — Thomas D Alunkal
(74) *Attorney, Agent, or Firm* — Womble Bond Dickinson (US) LLP (57) ABSTRACT

A method may include receiving a first symbol, and encoding the first symbol based on an initial codebook including a symbol frequency and a ranking for each symbol, and a group frequency for each group of symbols. The method may include incrementing a symbol frequency of the first symbol based on receiving the first symbol, swapping a rank of a lowest ranking symbol from among symbols in the initial codebook that have a symbol frequency lower than the incremented symbol frequency of the first symbol with a rank of the first symbol, in response to the symbol frequency of the lowest ranking symbol being lower than the incremented symbol frequency of the first symbol, and storing an updated codebook in a memory accessible by an encoder and/or a decoder.

20 Claims, 8 Drawing Sheets

(56) References Cited

U.S. PATENT DOCUMENTS

| | | | |
|---|---|---|---|
| 2019/0246140 A1* | 8/2019 | Sasai | H04N 19/593 |
| 2020/0036979 A1 | 1/2020 | Thirumalai | |
| 2022/0083282 A1* | 3/2022 | Sumiyoshi | G06F 3/0673 |
| 2022/0311452 A1 | 9/2022 | Rupasinghe et al. | |

* cited by examiner

| Symbol | Group | Prefix | Suffix (length) |
|---|---|---|---|
| $s_0 \sim s_1$ | 0 | 0 | x (1) |
| $s_2 \sim s_5$ | 1 | 10 | xx (2) |
| $s_6 \sim s_{13}$ | 2 | 110 | xxx (3) |
| $s_{14} \sim s_{29}$ | 3 | 1110 | xxxx (4) |
| $s_{30} \sim s_{61}$ | 4 | 11110 | xxxxx (5) |
| $s_{62} \sim s_{125}$ | 5 | 111110 | xxxxxx (6) |
| $s_{126} \sim s_{253}$ | 6 | 1111110 | xxxxxxx (7) |
| $s_{254} \sim s_{255}$ | 7 | 1111111 | xxxxxxxx (8) |

FIG. 1

| Symbols | Symbol Freq | Ranks | Group | Group Freq | Prefix | Suffix |
|---|---|---|---|---|---|---|
| $s_0$ | 0 | 0 | 0 | 0 | 0 | 0 |
| $s_1$ | 0 | 1 |   |   |   | 1 |
| $s_2$ | 0 | 2 | 1 | 0 | 10 | 00 |
| $s_3$ | 0 | 3 |   |   |   | 01 |
| $s_4$ | 0 | 4 |   |   |   | 10 |
| $s_5$ | 0 | 5 |   |   |   | 11 |
| $s_6$ | 0 | 6 | 2 | 0 | 110 | 000 |
| $s_7$ | 0 | 7 |   |   |   | 001 |
| ... | ... | ... | ... | ... | ... | ... |
| $s_{15}$ | 0 | 15 | 3 | 0 | 111 | 0001 |

FIG. 2

| Symbols | Symbol Freq | Ranks | Group | Group Freq | Prefix | Suffix |
|---|---|---|---|---|---|---|
| $s_0$ | 2 | 0 | 0 | 3 | 0 | 0 |
| $s_1$ | 1 | 1 | 0 | | 0 | 1 |
| $s_2$ | 0 | 2 | 1 | 0 | 10 | 00 |
| $s_3$ | 0 | 3 | 1 | | 10 | 01 |
| $s_4$ | 0 | 4 | 1 | | 10 | 10 |
| $s_5$ | 0 | 5 | 1 | | 10 | 11 |
| $s_6$ | 0 | 6 | 2 | 0 | 110 | 000 |
| $s_7$ | 0 | 7 | 2 | | 110 | 001 |
| ... | ... | ... | ... | ... | ... | ... |
| $s_{15}$ | 0 | 15 | 3 | 0 | 111 | 0001 |

FIG. 3

| Symbols | Symbol Freq | Ranks | Group | Group Freq | Prefix | Suffix |
|---|---|---|---|---|---|---|
| $s_0$ | 2 | 0 | 0 | 3 | 0 | 0 |
| $s_1$ | 1 | 1 | | | | 1 |
| $s_2$ | 1 | 2 | 1 | 2 | 10 | 00 |
| $s_6$ | 1 | 3 | | | | 01 |
| $s_4$ | 0 | 4 | | | | 10 |
| $s_5$ | 0 | 5 | | | | 11 |
| $s_3$ | 0 | 6 | 2 | 0 | 110 | 000 |
| $s_7$ | 0 | 7 | | | | 001 |
| ... | ... | ... | ... | ... | ... | ... |
| $s_{15}$ | 0 | 15 | 3 | 0 | 111 | 0001 |

FIG. 4

| Symbols | Symbol Freq | Ranks | Group | Group Freq | Prefix | Suffix |
|---|---|---|---|---|---|---|
| $s_0$ | 2 | 0 | 0 | 3 | 10 | 0 |
| $s_1$ | 1 | 1 | | | | 1 |
| $s_2$ | 1 | 2 | 1 | 4 | 0 | 00 |
| $s_6$ | 1 | 3 | | | | 01 |
| $s_4$ | 1 | 4 | | | | 10 |
| $s_5$ | 1 | 5 | | | | 11 |
| $s_3$ | 0 | 6 | 2 | 0 | 110 | 000 |
| $s_7$ | 0 | 7 | | | | 001 |
| ... | ... | ... | ... | ... | ... | ... |
| $s_{15}$ | 0 | 15 | 3 | 0 | 111 | 0001 |

FIG. 5

| Symbols | Symbol Freq | Ranks | Group | Group Freq | Prefix | Suffix |
|---|---|---|---|---|---|---|
| $s_0$ | 2 | 0 | 0 | 4 | 10 | 0 |
| $s_6$ | 2 | 1 | | | | 1 |
| $s_2$ | 1 | 2 | 1 | 4 | 0 | 00 |
| $s_1$ | 1 | 3 | | | | 01 |
| $s_4$ | 1 | 4 | | | | 10 |
| $s_5$ | 1 | 5 | | | | 11 |
| $s_3$ | 0 | 6 | 2 | 0 | 110 | 000 |
| $s_7$ | 0 | 7 | | | | 001 |
| ... | ... | ... | ... | ... | ... | ... |
| $s_{15}$ | 0 | 15 | 3 | 0 | 111 | 0001 |

SYSTEM AND METHOD FOR GROUP PROBABILITY-BASED PREFIX MODIFICATION OF UNKNOWN SYMBOL PROBABILITY DISTRIBUTIONS

CROSS-REFERENCE TO RELATED APPLICATION(S)

This application claims the priority benefit under 35 U.S.C. § 119 (e) of U.S. Provisional Application No. 63/530,657, filed on Aug. 3, 2023, the disclosure of which is incorporated by reference in its entirety as if fully set forth herein.

FIELD

The disclosure generally relates to entropy coding. More particularly, the subject matter disclosed herein relates to improvements to a system and a method for group probability-based prefix modification of unknown symbol probability distributions.

SUMMARY

In digital signal processing, data (which may also be referred to as a "symbol") is often encoded (e.g., into binary bits) by an encoder before being transmitted by a transmitter, and then decoded by a decoder upon receiving the encoded signal by a receiver. Electronic devices such as cellular phones, televisions, and other audio or video devices often utilize such digital signals when transmitting them between one device and another and/or even within the device itself, for example, transmitting a digital signal from one part of the device to another part of the same device. To effectively and efficiently transmit the digital signal, the encoding process may include compressing the digital signal such that fewer number of bits may be used to represent the original data.

Entropy encoding is a coding technique for digital signal processing that assigns a binary code to a symbol based on a probability of occurrence of that symbol. Some entropy coding techniques use binary code that can be represented by a combination of prefix and suffix, where the prefixes may be unique and the corresponding suffixes may have a fixed length. In the present disclosure, these codes may be referred to as prefix-suffix entropy codes and may include entropy codes such as, exponential Golomb codes, Elias gamma/delta/omega codes, Levenstein codes, etc.

One or more embodiments of the present disclosure may describe techniques to further optimize the entropy encoding.

According to a first embodiment of the present disclosure, a method may include: receiving, by an encoder, a first symbol; encoding, by the encoder, the first symbol based on an initial codebook including a symbol frequency and a ranking for each symbol, and a group frequency for each group of symbols; incrementing a symbol frequency of the first symbol based on receiving the first symbol; swapping a rank of a lowest ranking symbol from among symbols in the initial codebook that have a symbol frequency lower than the incremented symbol frequency of the first symbol with a rank of the first symbol, in response to the symbol frequency of the lowest ranking symbol being lower than the incremented symbol frequency of the first symbol; and storing an updated codebook in a memory accessible by the encoder.

The method may further include updating group frequencies based on the incremented symbol frequency of the first symbol and the swapping.

The method may further including: determining that a first group frequency of a first group is lower than a second group frequency of a second group; and swapping a first prefix corresponding to the first group with a second prefix corresponding to the second group in response, wherein a rank of the first group is lower than a rank of the second group.

The method may further include transmitting the encoded first symbol to a decoder in response to the encoder receiving the first symbol.

The first symbol may be encoded based on the initial codebook, the encoding being an entropy encoding.

The storing the updated codebook may include replacing the initial codebook in the memory with the updated codebook.

The symbol frequencies and group frequencies may be reset to zero in the initial codebook.

The initial codebook may be based on exponential Golomb codebook.

The initial codebook may include prefix-suffix codewords corresponding to symbols.

According to a second embodiment of the present disclosure, a method may include: receiving, by a decoder, a first code word; decoding, by the decoder, the first code word based on an initial codebook including a symbol frequency and a ranking for each symbol, and a group frequency for each group of symbols; incrementing a symbol frequency of a first symbol decoded from the first code word; swapping a rank of a lowest ranking symbol from among symbols in the initial codebook that have a symbol frequency lower than the incremented symbol frequency of the first symbol with a rank of the first symbol, in response to the symbol frequency of the lowest ranking symbol being lower than the incremented symbol frequency of the first symbol; and storing an updated codebook in a memory accessible by the decoder.

The method may further include updating group frequencies based on the incremented symbol frequency of the first symbol and the swapping.

The method may further include: determining that a first group frequency of a first group is lower than a second group frequency of a second group; and swapping a first prefix corresponding to the first group with a second prefix corresponding to the second group in response, wherein a rank of the first group is lower than a rank of the second group.

The first symbol may be decoded based on the initial codebook, the decoding being an entropy decoding.

The storing the updated codebook may include replacing the initial codebook in the memory with the updated codebook.

The symbol frequencies and group frequencies may be reset to zero in the initial codebook.

The initial codebook may be based on exponential Golomb codebook.

The initial codebook may include prefix-suffix codewords corresponding to symbols.

According to a third embodiment of the present disclosure, a system may include: a memory; and a processor configured to execute instructions stored in the memory to perform operations including: receiving a first symbol; encoding the first symbol based on an initial codebook including a symbol frequency and a ranking for each symbol, and a group frequency for each group of symbols; incrementing a symbol frequency of the first symbol based on receiving the first symbol; swapping a rank of a lowest ranking symbol from among symbols in the initial codebook that have a symbol frequency lower than the incremented symbol frequency of the first symbol with a rank of the first symbol, in response to the symbol frequency of the lowest ranking symbol being lower than the incremented symbol frequency of the first symbol; and storing an updated codebook in a memory accessible by the encoder.

The operations may further include updating group frequencies based on the incremented symbol frequency of the first symbol and the swapping.

The operations may further include: determining that a first group frequency of a first group is lower than a second group frequency of a second group; and swapping a first prefix corresponding to the first ranked group with a second prefix corresponding to the second group in response, wherein a rank of the first group is lower than a rank of the second group.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Figure 1:
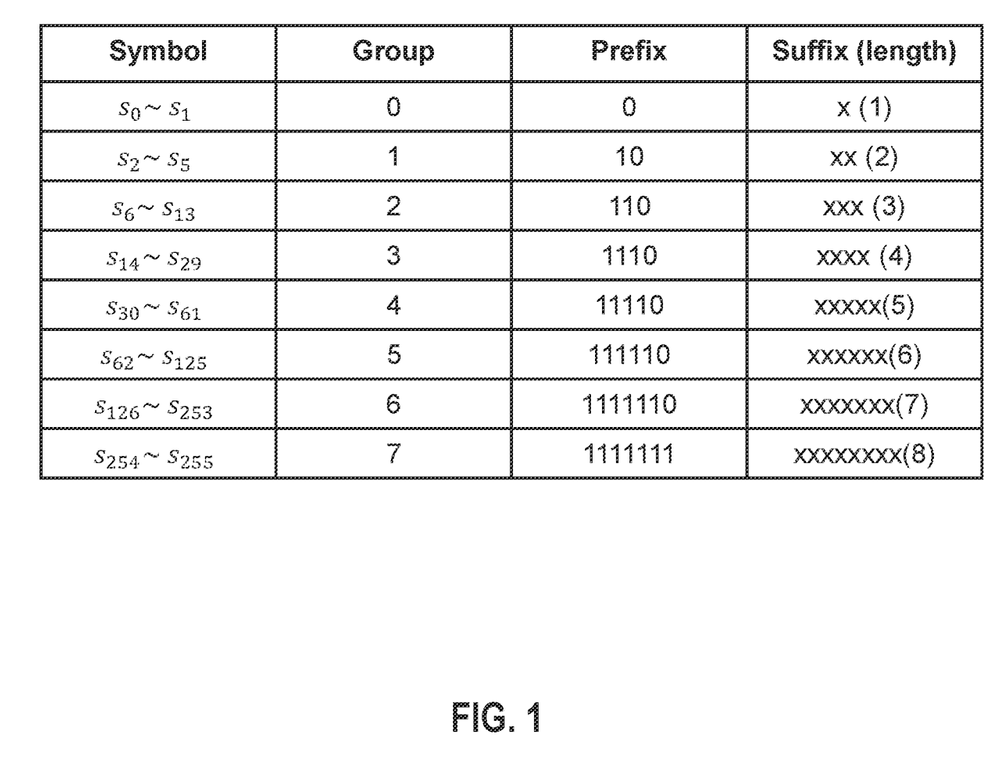
FIG. 1 is an illustration of an example codebook for 256 symbols using truncated exponential Golomb codes.

In one or more embodiments of the present disclosure, techniques will be described to further reduce the number of bits utilized by these prefix-suffix entropy codes. FIG. 1 is a table that illustrates an example codebook for 256 symbols using truncated exponential Golomb codes. The symbols may be represented as $s_0$-$s_{255}$ and grouped into 8 groups, 0-7. Furthermore, it is assumed that the probability or frequency (i.e., probability or frequency of occurrence) of $s_0$ is higher than or equal to the probability of $s_1$. Therefore, for example, the probability of $s_1$ is higher than or equal to the probability of $s_2$, the probability of $s_2$ is higher or equal to the probability of $s_3$, and so on. It should be noted that although the codebook shown in FIG. 1 includes 256 symbols, a codebook may instead include fewer or greater symbols, for example, 16 symbols, 512 symbols, 1024 symbols, etc. As shown in FIG. 1, a group of symbols may be sorted or assigned to a group, and each group may have a unique prefix that is shared by all symbols in that group. Thus, for example, all symbols in group 0 (i.e., symbols $s_0$-$s_1$) have a prefix 0, all symbols in group 1 (i.e., symbols $s_2$-$s_5$) have a prefix 10, and all symbols in group 2 (i.e., symbols $s_6$-$s_{13}$) have a prefix 110, and so on. However, the suffixes for each symbol are unique to each symbol even if the symbols are in the same group. Accordingly, every symbol has a unique binary code. Furthermore, although each suffix is unique, the suffixes for the symbols belonging to the same group are all made up of the same number of bits. In other words, the bit length of the suffix is the same for all symbols in the same group. For example, the suffix for all of the symbols in group 0 have a length of 1 (i.e., 1 bit), the suffix for all of the symbols in group 1 have a length of 2 (i.e., 2 bits), the suffix for all of the symbols in group 2 have a length of 3 (i.e., 3 bits), and so on.

Additionally, the suffixes for the symbols are sequential such that the first symbol in a particular group has a suffix corresponding to a first binary number in that group and the last symbol in that particular group has a suffix corresponding to the last binary number in that group. For example, in group 0, $s_0$ is the first symbol so the corresponding suffix is 0 and $s_1$ is the last symbol in this group so that corresponding suffix is 1. In group 1, $s_2$ is the first symbol so the corresponding suffix is 00, $s_3$ is the second symbol so the corresponding suffix is 01, $s_4$ is the third symbol so the corresponding suffix is 10, and $s_5$ is the fourth (and the last) symbol of this group so the corresponding suffix is 11. Thus, the binary code for the symbol is the combination of the prefix and the suffix as shown in the table. For example, the code for symbol $s_0$ is 00 (i.e., prefix=0; suffix=0), and the code for symbol $s_1$ is 01 (i.e., prefix=0; suffix=1).

However, these prefix-suffix codes assume a certain probability distribution for the symbols. For example, exponential Golomb codes assume that the symbols have a geometric distribution. Therefore, these codes may perform most effectively if the symbols have an actual geometric distribution. However, exponential Golomb codes may be used on data that may not necessarily have a geometric distribution, thus leading to suboptimal binary codes. The same can be said for other prefix-suffix coding techniques, such as Elias gamma/delta/omega codes whereby these code assume a certain probability distribution but the actual distribution may be different. Accordingly, it is desirable to improve such entropy coding techniques to better fit actual probability distribution of the symbols. However, the actual probability distribution of the symbols may not necessarily be known thereby making it difficult to find better coding methods. Therefore, one or more embodiments of the present disclosure are directed to dynamically modifying an existing codebook based on the frequency of occurrence of the symbols received such that the codebook is updated on-the-fly with actual probability distribution as the incoming data (or symbols) are received. Accordingly, the codebook may be updated in real-time by learning the actual probability distribution of the symbols as the symbols are received, thereby optimizing the entropy encoded binary codes. Furthermore, as the probability distribution of the symbols change, the code book may continue to be updated based on the new probability distribution. As a result, the symbols can change from one group to another on an on-going basis. Furthermore, the modification of the codebook according to various embodiments of the present disclosure may also be implemented by the decoder in real-time so that the decoder may decode the received binary code.

In one or more embodiments of the present disclosure, as the codebook is updated, only the prefixes, only the suffixes, or both the prefixes and the suffixes of these prefix-suffix coding techniques may be modified such that the assignment of the binary codes to the symbols is more optimal for the actual probability distribution of the symbols.

Figure 2:
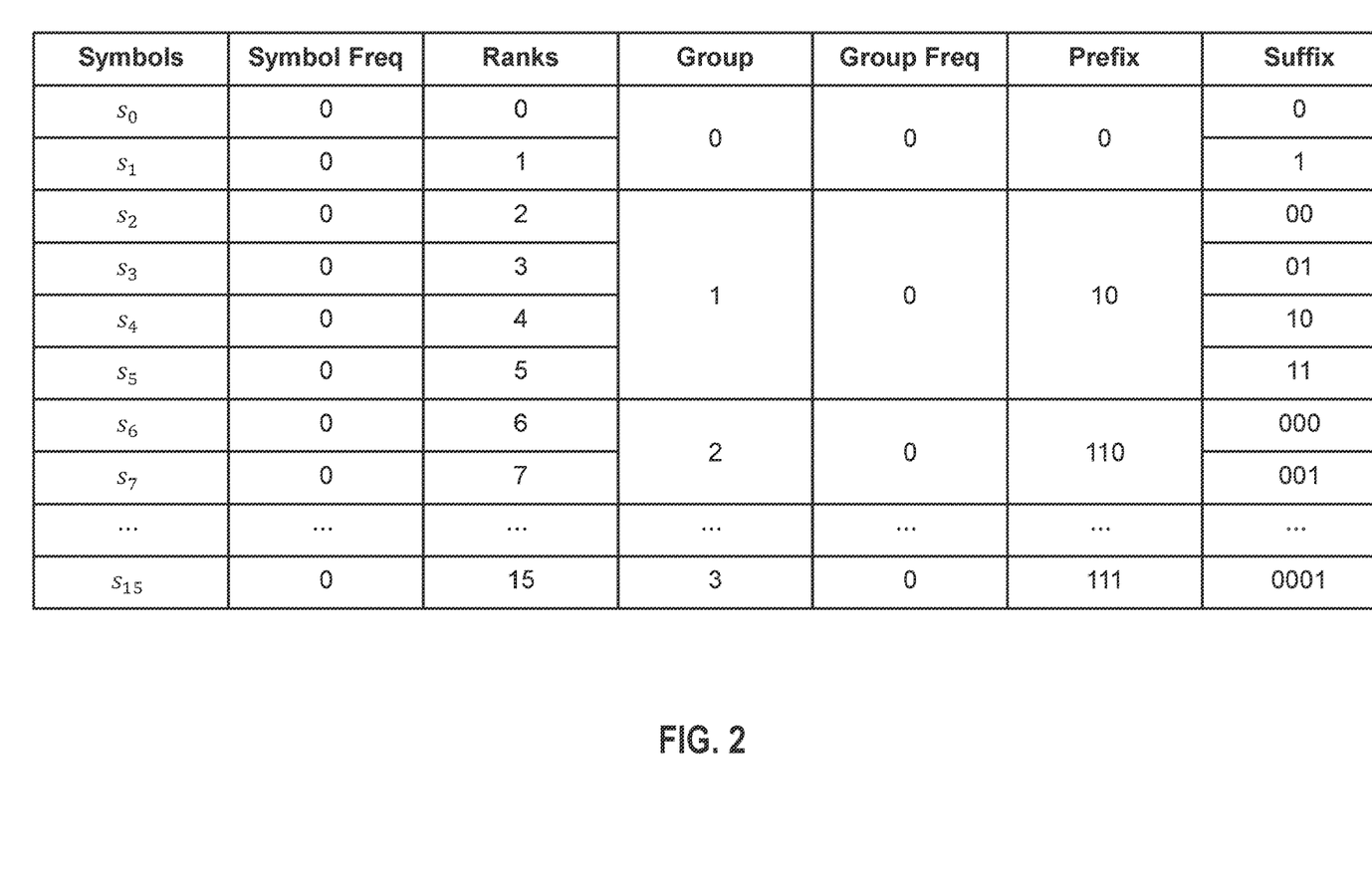
FIG. 2 is an illustration of an example codebook that may be modified according to one or more embodiments of the present disclosure.

FIG. 2 illustrates an example codebook that may be modified according to one or more embodiments of the present disclosure. Similar to the table illustrated in FIG. 1, the table in FIG. 2 represents a truncated exponential-Golomb codebook except only 16 symbols are listed for simplicity in explaining the techniques of the present disclosure. However, as noted above, the one or more embodiments of the present disclosure may be applied to codebooks that include more or fewer symbols.

Here, the codebook lists 16 symbols $s_0$-$s_{15}$ and their corresponding symbol frequencies (e.g., frequency of occurrence of the symbol), ranking of the symbols based on the frequencies, a grouping of the symbols and their corresponding group frequencies (e.g., frequency of occurrence of the symbol in the group), and the corresponding prefixes and suffixes for the symbols. More specifically, for the purpose of this example codebook, symbols $s_0$ and $s_1$ are in group 0, symbols $s_2$-$s_5$ are in group 1, symbols $s_6$-$s_7$ are in group 2, and symbol $s_{15}$ is in group 3. Furthermore, a prefix of 0 and a suffix of 0 corresponds to symbol $s_0$; a prefix of 0 and a suffix of 1 corresponds to symbol $s_1$; a prefix of 10 and a suffix of 00 corresponds to symbol $s_2$; a prefix of 10 and a suffix of 01 corresponds to symbol $s_3$; a prefix of 10 and a suffix of 10 corresponds to symbol $s_4$; a prefix of 10 and a suffix of 11 corresponds to symbol $s_5$; a prefix of 110 and a suffix of 000 corresponds to symbol $s_6$; a prefix of 110 and a suffix of 001 corresponds to symbol $s_7$; and a prefix of 111 and a suffix of 0001 corresponds to symbol $s_{15}$, by way of example. Because this codebook shows the initial state of the codebook, all symbol frequencies are initialized to a frequency of zero and all group frequencies are initialized to a frequency of zero. As the encoder receives incoming data, the symbol frequencies may be updated, which in turn may update the group frequencies. Therefore, the symbols can move from one group to another group, the symbol rankings may change, and the group prefixes may be modified based on the symbol switching and the group frequencies (or probabilities). These steps will be described in further detail.

Here in the present disclosure, $f_i$ represents the frequency of symbol $s_i$ and $r_i$ represents its rank. Therefore, $f_j$ is the frequency of symbol $s_j$ and $r_j$ is its rank. Thus, if $f_i \geq f_j$ then $r_i < r_j$. In other words, the higher the frequency of occurrence (or higher probability of occurrence), the smaller the rank. One or more embodiments of the present disclosure will be described by assuming that symbols are received by the encoder (for encoding and then transmission) in the following order: $s_0, s_0, s_1, s_2, s_6, s_4, s_5, s_6$. Therefore, according to a first step, when the first symbol $s_0$ is received by the encoder, the encoder may transmit the prefix-suffix code 00. Here, based on the initialized codebook (e.g., the codebook in FIG. 2), the prefix-suffix code for so corresponds to a prefix of 0 and a suffix of 0. Therefore, the prefix-suffix code 00 is sent to the decoder. Furthermore, at the encoder, the symbol frequency for so may be incremented by 1 because the encoder received so one time. In other words, there was one occurrence of the symbol so. At this time, so has the highest frequency out of all of the symbols that are in the codebook and has a default (or initial) rank value of 0, which is the lowest rank. Therefore, the prefix portion of the codebook is not updated. However, because the symbol frequency for so was incremented, the group frequency for group 0 (which is the group that so belongs) is also incremented.

Next, the encoder receives a second symbol, which is again $s_0$ so the same prefix-suffix code 00 is sent to the decoder, and the symbol frequency for $s_0$ is incremented by 1. Therefore, the symbol frequency for $s_0$ is now 2, and is the highest symbol frequency of all symbols in the codebook. Because so already has the lowest (or smallest) rank 0, the codebook is correct in its current state and no further updates are made to the codebook. However, the group frequency for group 0 is also incremented by 1 to now have a value of 2 because the symbol frequency was incremented.

Figure 3:
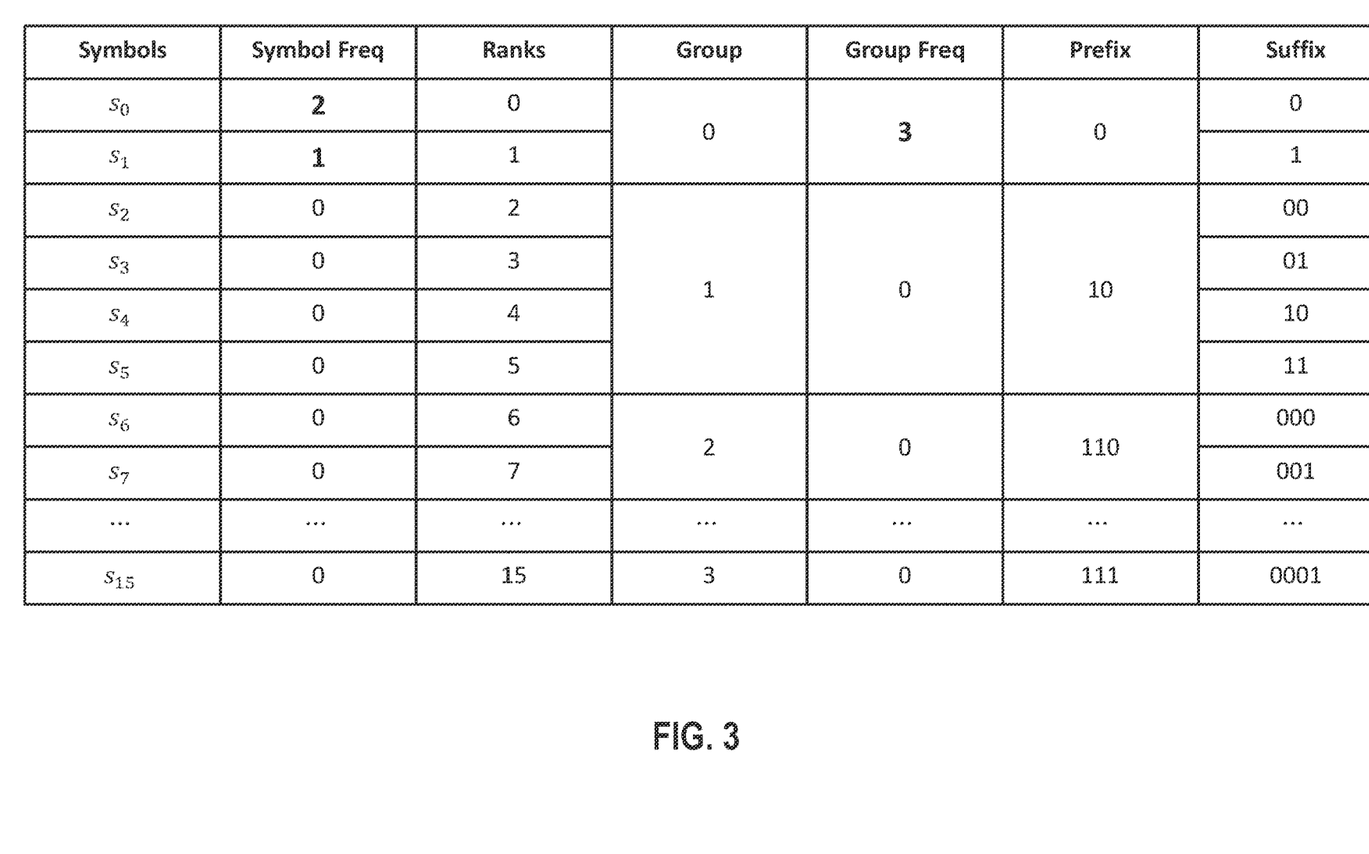
FIG. 3 is an illustration of the codebook after the first three symbols of an example stream of symbols are received by an encoder and the codebook is updated, according to one or more embodiments of the present disclosure.

Next, the encoder receives a third symbol $s_1$, so the prefix-suffix code 01 is sent to the decoder and the symbol frequency for $s_1$ is incremented by 1. Therefore, the symbol frequency for $s_1$ is 1. Because $s_1$ now has the second highest symbol frequency and the second lowest rank of 1, the codebook is correct in its current state and no further updates are made to the codebook. In other words, out of all of the symbol frequencies in the codebook that are lower than the symbol frequency corresponding to $s_1$ (i.e., any symbol frequency that is less than 1), the symbol frequency of $s_1$ is the lowest rank so no further updates are made to the codebook. However, because the symbol frequency was updated, the group frequency of group 0 is incremented by 1 so that it now has a value of 3. FIG. 3 shows the status of the codebook after the first three symbols $s_0, s_0, s_1$ are received and the codebook is updated. As can be seen, the group frequency is the total of the symbol frequencies in that particular group.

Next, the encoder receives a fourth symbol, which is $s_2$, so the prefix-suffix code 1000 is sent to the decoder, and the symbol frequency for $s_2$ is incremented by 1. Because $s_2$ has the same symbol frequency as $s_1$ but has a higher rank of 2, the prefix portion of the codebook is not updated. However, the group frequency for group 1 is incremented by 1 because $s_2$ is in group 1.

Figure 4:
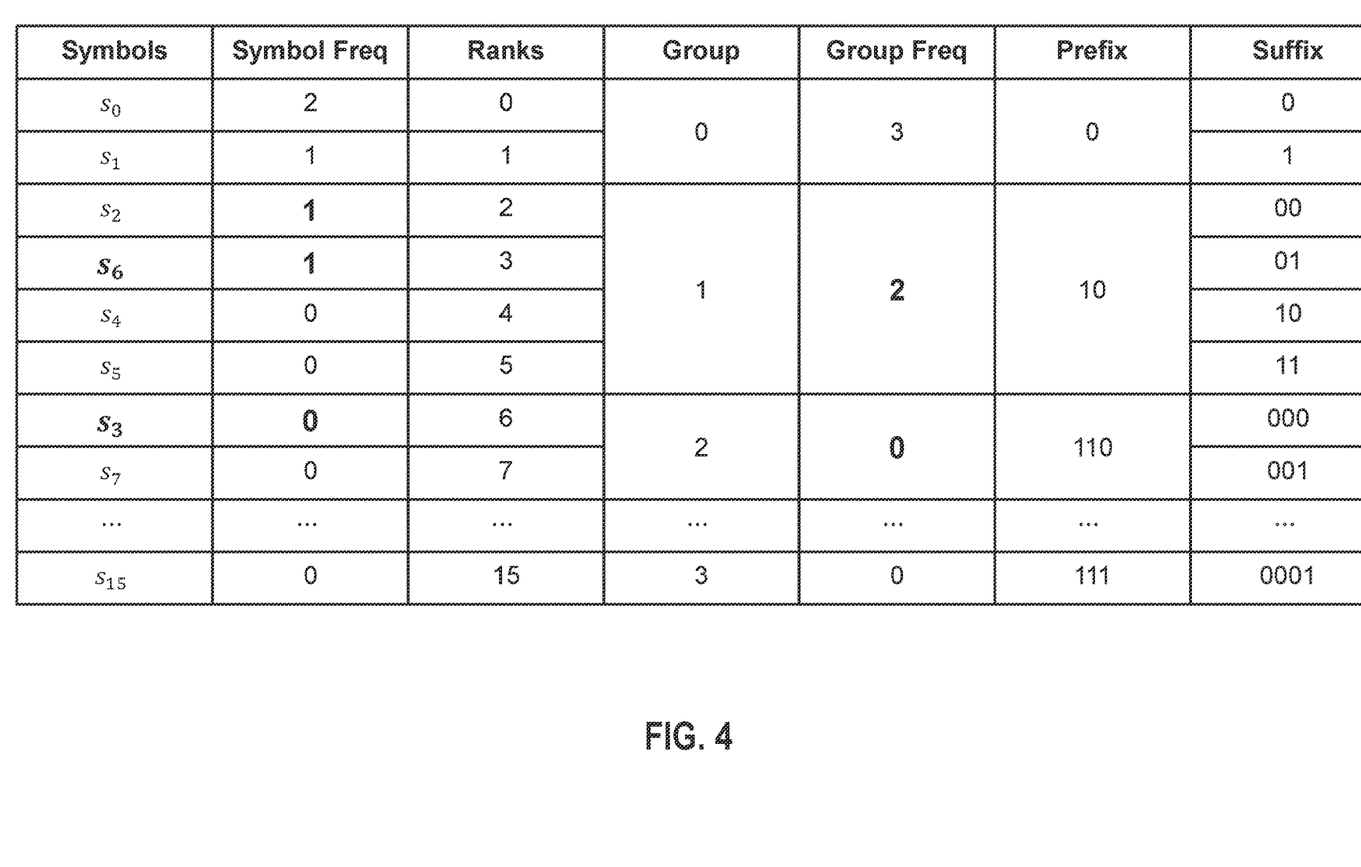
FIG. 4 is an illustration of the codebook after the first five symbols of an example stream of symbols are received by an encoder and the codebook is updated, according to one or more embodiments of the present disclosure.

Next, the encoder receives a fifth symbol, which is $s_6$, so the prefix-suffix code 110000 is sent to the decoder, and the symbol frequency for $s_6$ is incremented by 1. Now, because $s_6$ has a higher symbol frequency than symbols $s_3, s_4, s_5$ (which have a symbol frequency of 0) but also has a higher rank than symbols $s_3, s_4, s_5$, the rank of $s_6$ is swapped with $s_3$, which is the lowest ranked symbols out of $s_3, s_4, s_5$. Therefore, the rank of symbol $s_6$ is elevated to rank 3 and as a result, $s_6$ is moved to group 1, and the rank of symbol $s_3$ is now downgraded to rank 6 and is moved to group 2. Based on this new ranking and new grouping, the group frequency of group 1 (i.e., the new group corresponding to $s_6$) is updated. Accordingly, group 1 now has a group frequency of 2. FIG. 4 shows the status of the codebook after the first five symbols $s_0, s_0, s_1, s_2, s_6$ are received and the codebook is updated.

Next, the encoder receives a sixth symbol, which is $s_4$, so the prefix-suffix code 1010 is sent to the decoder, and the symbol frequency for $s_4$ is incremented by 1. Because $s_4$ has a lower rank than the other symbols that have a lower symbol frequency than $s_4$ (i.e., $s_3, s_5, s_7, s_{15}$ which all have a symbol frequency of 0), the ranking is not updated. The group frequency for group 1 is incremented by 1 and now has a value of 3. Group 1 and group 0 now have the same group frequency of 3 so the prefix portion of the codebook is not updated.

Figure 5:
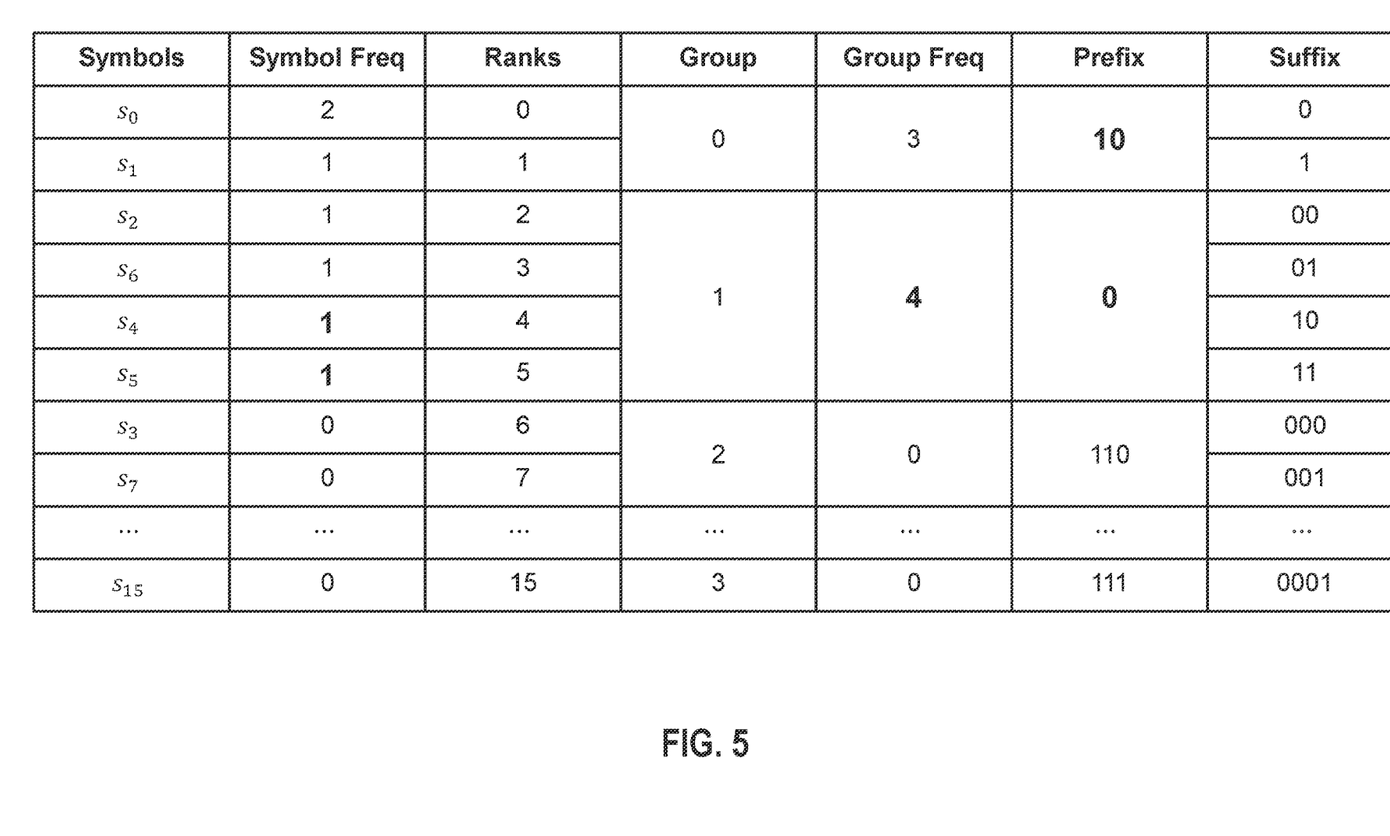
FIG. 5 is an illustration of the codebook after the first seven symbols of an example stream of symbols are received by an encoder and the codebook is updated, according to one or more embodiments of the present disclosure.
Figure 6:
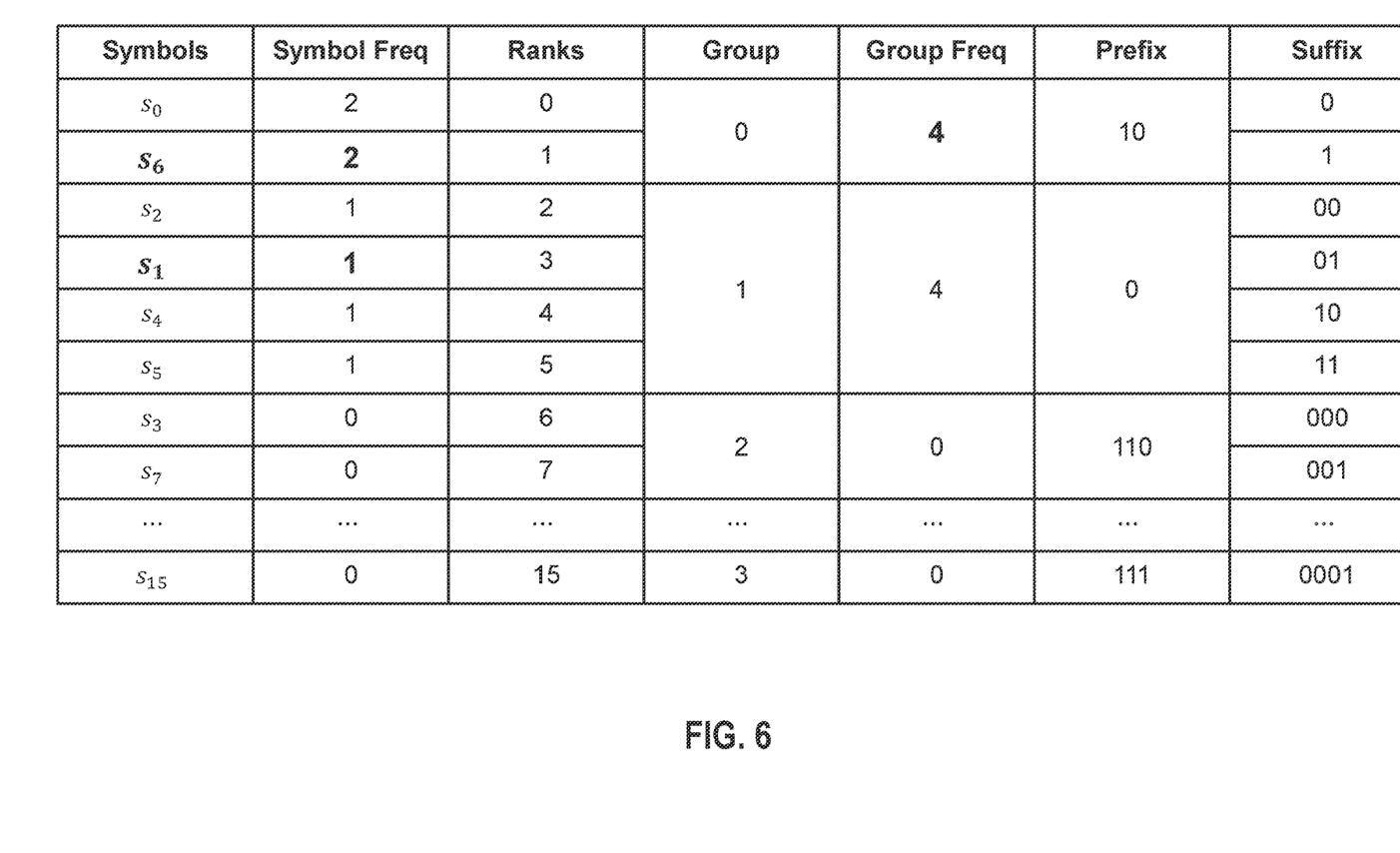
FIG. 6 is an illustration of the codebook after all eight of the symbols of an example stream of symbols are received by an encoder and the codebook is updated, according to one or more embodiments of the present disclosure.

Next, the encoder receives a seventh symbol, which is $s_5$, so the prefix-suffix code 1011 is sent to the decoder, and the symbol frequency for $s_5$ is incremented by 1. Because $s_5$ has a lower rank than the other symbols that have a lower symbol frequency than $s_5$ (i.e., $s_3, s_7, s_{15}$ which all have a symbol frequency of 0), the ranking is not updated. The group frequency for group 1 is incremented by 1 and now has a value of 4. Now, because the group frequency for group 1 is higher than the group frequency of group 0, a group frequency inversion exists. In other words, a group frequency inversion exists when the group frequency of a higher ranked group (i.e., higher rank number) has a higher group frequency than the group frequency of a lower ranked group (i.e., lower rank number). Because of the presence of the group frequency inversion, the prefixes of group 0 and group 1 are swapped. Accordingly, group 0 now has a prefix 10 and group 1 has a prefix 0. FIG. 5 shows the status of the codebook after the first seven symbols $s_0, s_0, s_1, s_2, s_6, s_4, s_5$ are received and the codebook is updated. In the present disclosure, the terms "inversion" or "probability inversion" may be defined as a condition when given Px and Py, where Px>Py but Px appears after Py in a given string of probabilities.

Finally, the encoder receives the eighth symbol, which is $s_6$, so the prefix-suffix code 001 is sent to the decoder, and the symbol frequency for $s_6$ is incremented by 1. As can be seen from FIG. 5, the binary code for $s_6$ is much shorter (i.e., 010) than the binary code for $s_6$ in the codebook at initialization (i.e., 110000). The symbol frequency for $s_6$ now has a value 2, and therefore has a higher symbol frequency than $s_1$, $s_2$, while still having a higher rank than $s_1$, $s_2$. Therefore, the rank of symbol $s_6$ is swapped with the rank of $s_1$ because $s_1$ has the lowest rank among $s_1$, $s_2$. As a result, symbol $s_6$ is elevated to rank 1 and is assigned to group 0. Consequently, the group frequency of group 0 is updated to 4 accordingly. Because the group frequencies of group 0 and 1 are the same, no update to the codebook (i.e., no update to the prefix) is performed. Accordingly, this completes the process for updating the codebook based on the example 8 symbols described herein. As additional symbols are received by the encoder, the same process may be performed and the codebook may continue to be updated in real-time.

In one or more embodiments of the present disclosure, as the above provided example symbols are encoded by the encoder, the bitstream 000001100011000010101011001 is transmitted to a receiver including a decoder. As with the encoder, the decoder may also include the same initial codebook as the initial codebook used by the encoder. By utilizing this initialized codebook, the decoder may decode 00 from the bitstream to determine that the first symbol is $s_0$. The symbol frequency and group frequency are updated accordingly in the same manner as described above in the encoder for the first received symbol. Therefore, in this case, after the first symbol $s_0$ is received, the symbol frequency for $s_0$ is incremented and the group frequency for group 0 is incremented, while prefix for the codebook does not change. Accordingly, the decoder codebook may be updated to have an identical codebook as the one modified at the encoder thereby being more aligned with the actual probability distribution.

The decoder may next decode 00 from the bitstream 00000110001100001010101011001 to determine that the next symbol is again $s_0$. Accordingly, the symbol frequency and group frequency are updated again and the prefix of the codebook remains unchanged.

Next, the decoder may decode 01 from the bitstream 00000110001100001010101011001 to determine that the next symbol is $s_1$, and the symbol frequency and the group frequency are updated again while the codebook remains unchanged.

Next, the decoder may decode 1000 from the bitstream 00000110001100001010101011001 to determine that the next symbol is $s_2$, followed by decoding 110000 from the bitstream to determine that the next symbol is $s_6$. In the same manner as in the encoder, after symbol $s_6$ is received by the decoder, the rank of symbol $s_6$ is updated by swapping with rank of symbol $s_3$. The modified codebook is identical to the codebook that was modified by the encoder as shown in FIG. 4. Thus, the codebook used by the decoder is in sync with the encoder and therefore proper decoding may be performed.

Figure 7:
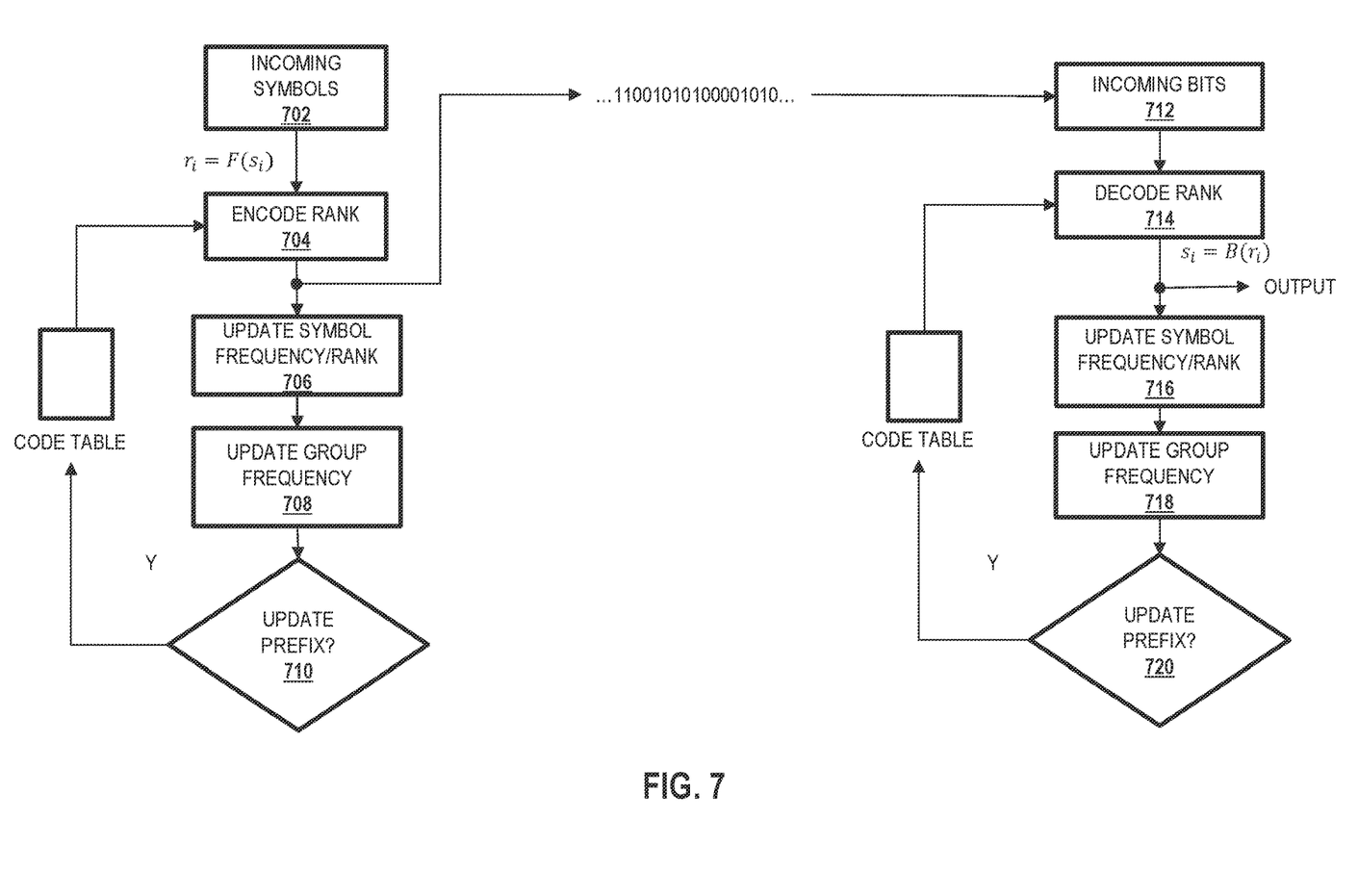
FIG. 7 is a flow chart illustrating a method for modifying an initialized codebook of an encoder and a decoder according to one or more embodiments of the present disclosure.

FIG. 7 is a flow chart illustrating a method for modifying an initialized codebook of an encoder and a decoder according to one or more embodiments of the present disclosure. At step 702, an encoder may receive one or more symbols that are to be encoded. At step 704, the encoder may encode a first symbol of the received one or more symbols based on an initial codebook comprising a symbol frequency and a ranking for each symbol, and a group frequency for each group of symbols. In other words, the encoder may utilize the encoder codebook to entropy encode the symbol into code word that has prefix bits and suffix bits (referred to herein as prefix-suffix code words) that correspond to the symbol frequency, rankings for the symbols, and group frequency for groups of symbols. This codebook may be referred to as the initial codebook or a default codebook because this is the codebook that is provided when this encoding process started and before any modifications are made to the codebook. After the symbols are encoded by the encoder, the encoded code words may be transmitted or sent to the decoder.

After the first symbol is received and the first symbol is encoded, the symbol frequency of the first symbol may be incremented at step 706. In some embodiments, a rank of the lowest ranking symbol from among symbols in the initial codebook that have a symbol frequency lower than the incremented symbol frequency of the first symbol may be swapped with a rank of the first symbol. In other words, the ranks are swapped if the rank of lowest ranking symbol (i.e., the lowest ranking symbol out of the set of symbols that have a frequency of occurrence that is less than the frequency of occurrence of the first symbol) is smaller in value than the rank of the first symbol (i.e., the symbol that was received by the encoder and then incremented).

In some embodiments, a group frequency corresponding to a group comprising the first symbol may be updated based on the incremented symbol frequency of the first symbol. Additionally, the group frequencies corresponding to the groups that include symbols where the rankings were swapped, are also updated at step 708. Next, a determination is made whether a first group frequency of a first group is lower than a second group frequency of a second group, and if so, a first prefix corresponding to the first group may be swapped with a second prefix corresponding to the second group at step 710. It should be noted here that the rank of the first group is lower (e.g., a smaller number) than the rank of the second group. However, if the first group frequency of a first group is not lower than a second group frequency of a second group, then the prefix is not swapped. Finally, the updated codebook may be stored in a memory that is accessible by the encoder so that the encoder can use the updated codebook. In some embodiments, when the updated codebook is stored in the memory, the initial codebook may be erased or overwritten by the newly modified codebook. Therefore, when the next symbols are received by the encoder, the modified codebook is utilized as the next default codebook. Accordingly, this process may continue such that the codebook is continuously updated based on the received symbols in real-time.

Next, the processes for updating the codebook on the decoder side will be described. At step 712, the code words (i.e., encoded bits) sent from the encoder are received by the decoder. At step 714, the decoder may decode the received first code word based on an initial codebook that maps code words to symbols, and includes a symbol frequency and a ranking for each symbol, and a group frequency for each group of symbols. This initial codebook includes the same table that the encoder utilized to entropy encode the symbols, and therefore the decoder is able to correctly decode the code words to generate the symbol that was originally encoded by the encoder. Accordingly, the decoded symbol may now be outputted from the decoder and utilized by the system, such as for example, a computer system.

At step 716, once the code word is decoded and a first symbol is generated, a symbol frequency of a first symbol decoded from the first code word may be incremented. Note that this is similar to the process that occurred on the encoder side where the first symbol frequency was incremented. Additionally, a rank of the lowest ranking symbol from among symbols in the initial codebook that have a symbol frequency lower than the incremented symbol frequency of the first symbol may be swapped with the rank of the first symbol. In other words, the ranks are swapped if the rank of lowest ranking symbol (i.e., the lowest ranking symbol out of the set of symbols that have a frequency of occurrence that is less than the frequency of occurrence of the first symbol) is smaller in value than the rank of the first symbol (i.e., the symbol that was received by the encoder and then incremented).

In some embodiments, a group frequency corresponding to a group comprising the first symbol may be updated based on the incremented symbol frequency of the first symbol. Additionally, the group frequencies corresponding to the groups that include symbols where the rankings were swapped, are also updated at step 718. A determination may be made as to whether a first group frequency of a first group is lower than a second group frequency of a second group, and if so, a first prefix corresponding to the first group may be swapped with a second prefix corresponding to the second group at step 720. It should be noted here that the rank of the first group is lower (e.g., a smaller number) than the rank of the second group. However, if the first group frequency of a first group is not lower than a second group frequency of a second group, then the prefix is not swapped. Finally, the updated codebook may be stored in a memory that is accessible by the decoder so that the decoder can use the updated codebook. When the updated codebook is stored in the memory, the initial codebook may be erased or overwritten by the newly modified codebook. Accordingly, the updated codebook for the decoder is updated in real-time in the same manner as the updated codebook for the encoder.

Accordingly, as the number of prefixes is much smaller compared to the number of symbols, updating the prefixes does not add significant overhead to the computer and therefore a more improved efficiency may be achieved. Moreover, symbol switching coupled with group prefix modification gives an extra layer of flexibility to the dynamic algorithm, and one or more prefix-suffix codes designed for any probability model may be modified to best fit the probability distribution of the actual symbols and groups.

Figure 8:
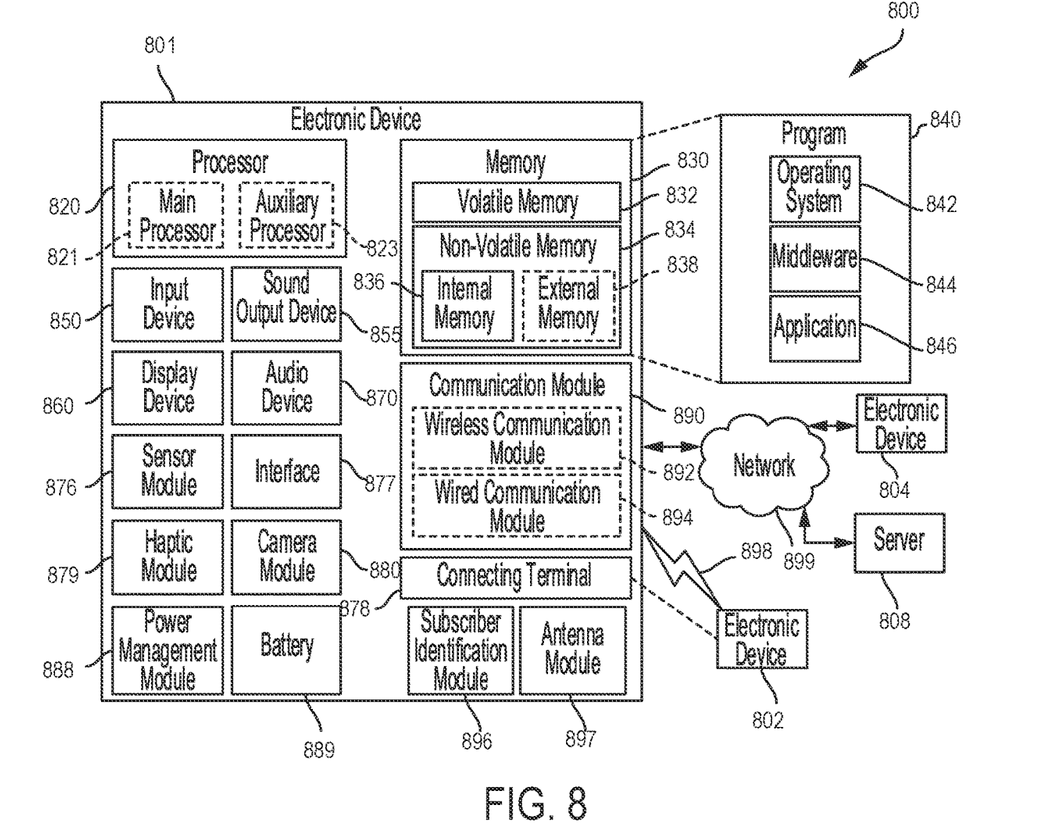
FIG. 8 is a block diagram of an electronic device in a network environment, according to one or more embodiments of the present disclosure.

FIG. 8 is a block diagram of an electronic device in a network environment 800, according to an embodiment.

Referring to FIG. 8, an electronic device 801 in a network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) card 896, or an antenna module 897. In one embodiment, at least one (e.g., the display device 860 or the camera module 880) of the components may be omitted from the electronic device 801, or one or more other components may be added to the electronic device 801. Some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute software (e.g., a program 840) to control at least one other component (e.g., a hardware or a software component) of the electronic device 801 coupled with the processor 820 and may perform various data processing or computations.

As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). The auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834. Non-volatile memory 834 may include internal memory 836 and/or external memory 838.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. The display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. The audio module 870 may obtain the sound via the input device 850 or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. The interface 877 may include, for example, a high-definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. The connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. The haptic module 879 may include, for example, a motor, a piezoelectric element, or an electrical stimulator. The camera module 880 may capture a still image or moving images. The camera module 880 may include one or more lenses, image sensors, image signal processors, or flashes. The power management module 888 may manage power supplied to the electronic device 801. The power management module 888 may be implemented as at least part of, for example, a power management integrated circuit (PMIC).

The battery 889 may supply power to at least one component of the electronic device 801. The battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. The communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as BLUETOOTH™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. The antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

Commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

Thus, when one or more of the electronic devices 801, 802, or 804 transmits digital signal to another one or more of the electronic devices 801, 802, or 804, the data (or symbols) that are transmitted may be entropy encoded by utilizing a the codebooks describe above, and then decoded by utilizing the codebooks as also describe above. Such codebooks may be dynamically updated on-the-fly as described according to one or more embodiments of the present disclosure such that the codebook is optimal based on the actual probability distribution of the symbols.

Figure 9:
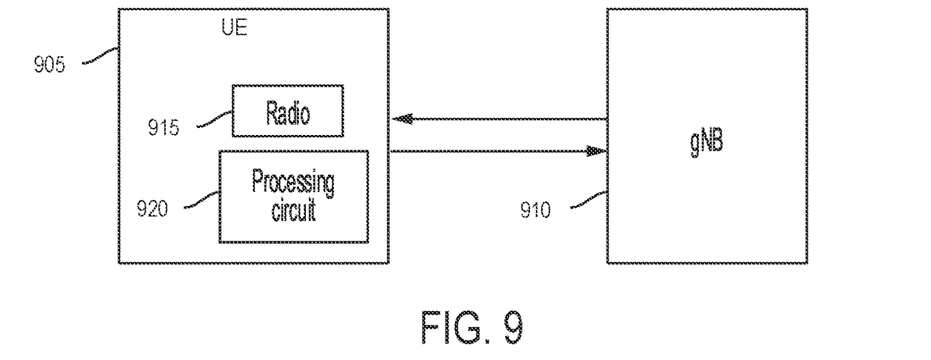
FIG. 9 shows a system including a UE and a gNB in communication with each other.

FIG. 9 shows a system including a UE 905 and a gNB 910, in communication with each other. The UE may include a radio 915 and a processing circuit (or a means for processing) 920, which may perform various methods disclosed herein, e.g., the method illustrated in FIG. 1. For example, the processing circuit 920 may receive, via the radio 915, transmissions from the network node (gNB) 910, and the processing circuit 920 may transmit, via the radio 915, signals to the gNB 910.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
   receiving, by an encoder, a first symbol;
   encoding, by the encoder, the first symbol based on an initial codebook comprising a symbol frequency and a ranking for each symbol, and a group frequency for each group of symbols;
   based on receiving the first symbol, incrementing a symbol frequency of the first symbol and separately incrementing a group frequency associated with the first symbol;
   swapping a rank of a lowest ranking symbol from among symbols in the initial codebook that have a symbol frequency lower than the incremented symbol frequency of the first symbol with a rank of the first symbol, in response to the symbol frequency of the lowest ranking symbol being lower than the incremented symbol frequency of the first symbol; and
   storing an updated codebook in a memory accessible by the encoder.

2. The method of claim 1, further comprising updating group frequencies based on the incremented symbol frequency of the first symbol and the swapping.

3. The method of claim 2, further comprising:
   determining that a first group frequency of a first group is lower than a second group frequency of a second group, the second group being associated with the first symbol; and
   swapping a first prefix corresponding to the first group with a second prefix corresponding to the second group in response,
   wherein a rank of the first group is lower than a rank of the second group.

4. The method of claim 3, further comprising transmitting the encoded first symbol to a decoder in response to the encoder receiving the first symbol.

5. The method of claim 4, wherein the first symbol is encoded based on the initial codebook, the encoding being an entropy encoding.

6. The method of claim 1, wherein the storing the updated codebook comprises replacing the initial codebook in the memory with the updated codebook.

7. The method of claim 1, wherein symbol frequencies and group frequencies are reset to zero in the initial codebook.

8. The method of claim 1, wherein the initial codebook is based on exponential Golomb codebook.

9. The method of claim 1, wherein the initial codebook comprises prefix-suffix codewords corresponding to symbols.

10. A method comprising:
    receiving, by a decoder, a first code word;

decoding, by the decoder, the first code word based on an initial codebook comprising a symbol frequency and a ranking for each symbol, and a group frequency for each group of symbols;

incrementing a symbol frequency of a first symbol decoded from the first code word, and separately incrementing a group frequency associated with the first symbol based on the incremented symbol frequency of the first symbol;

swapping a rank of a lowest ranking symbol from among symbols in the initial codebook that have a symbol frequency lower than the incremented symbol frequency of the first symbol with a rank of the first symbol, in response to the symbol frequency of the lowest ranking symbol being lower than the incremented symbol frequency of the first symbol; and storing an updated codebook in a memory accessible by the decoder.

11. The method of claim 10, further comprising updating group frequencies based on the incremented symbol frequency of the first symbol and the swapping.

12. The method of claim 11, further comprising:

determining that a first group frequency of a first group is lower than a second group frequency of a second group, the second group being associated with the first symbol; and swapping a first prefix corresponding to the first group with a second prefix corresponding to the second group in response, wherein a rank of the first group is lower than a rank of the second group.

13. The method of claim 10, wherein the first symbol is decoded based on the initial codebook, the decoding being an entropy decoding.

14. The method of claim 10, wherein the storing the updated codebook comprises replacing the initial codebook in the memory with the updated codebook.

15. The method of claim 10, wherein symbol frequencies and group frequencies are reset to zero in the initial codebook.

16. The method of claim 10, wherein the initial codebook is based on exponential Golomb codebook.

17. The method of claim 10, wherein the initial codebook comprises prefix-suffix codewords corresponding to symbols.

18. A system comprising:

a memory; and a processor configured to execute instructions stored in the memory to perform operations comprising:

receiving a first symbol;

encoding the first symbol based on an initial codebook comprising a symbol frequency and a ranking for each symbol, and a group frequency for each group of symbols;

based on receiving the first symbol, incrementing a symbol frequency of the first symbol and separately incrementing a group frequency associated with the first symbol;

swapping a rank of a lowest ranking symbol from among symbols in the initial codebook that have a symbol frequency lower than the incremented symbol frequency of the first symbol with a rank of the first symbol, in response to the symbol frequency of the lowest ranking symbol being lower than the incremented symbol frequency of the first symbol; and storing an updated codebook in a memory accessible by the encoder.

19. The system of claim 18, wherein the operations further comprise updating group frequencies based on the incremented symbol frequency of the first symbol and the swapping.

20. The system of claim 19, wherein the operations further comprise:

determining that a first group frequency of a first group is lower than a second group frequency of a second group, the second group being associated with the first symbol; and swapping a first prefix corresponding to the first group with a second prefix corresponding to the second group in response, wherein a rank of the first group is lower than a rank of the second group.

* * * * *